United States Patent
Matsumoto

(10) Patent No.: US 7,252,386 B2
(45) Date of Patent: Aug. 7, 2007

(54) KEYSTONE DISTORTION CORRECTION OF A PROJECTOR

(75) Inventor: Morio Matsumoto, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 272 days.

(21) Appl. No.: 11/075,702

(22) Filed: Mar. 10, 2005

(65) Prior Publication Data

US 2005/0219472 A1  Oct. 6, 2005

(30) Foreign Application Priority Data

Mar. 30, 2004 (JP) ............................ 2004-099438
Jan. 14, 2005 (JP) ............................ 2005-007161

(51) Int. Cl.
- G03B 21/14 (2006.01)
- G09G 5/00 (2006.01)
- H04N 3/23 (2006.01)
- H04N 3/26 (2006.01)
- G06K 9/40 (2006.01)

(52) U.S. Cl. .......................... 353/69; 353/70; 345/647; 348/746; 348/806; 382/274; 382/275

(58) Field of Classification Search ................... 353/69, 353/70; 345/647; 348/745–747, 806, 807; 382/274, 275

See application file for complete search history.

(56) References Cited

U.S. PATENT DOCUMENTS

| | | | | |
|---|---|---|---|---|
| 6,939,011 B2* | 9/2005 | Kobayashi | ..................... | 353/69 |
| 7,034,852 B2* | 4/2006 | Matsuda et al. | ............ | 345/690 |
| 7,092,045 B2* | 8/2006 | Haruna et al. | ............... | 348/745 |
| 2005/0094108 A1* | 5/2005 | Kobayashi | ..................... | 353/69 |
| 2005/0206851 A1* | 9/2005 | Yokoyama et al. | ........... | 353/69 |
| 2006/0227298 A1* | 10/2006 | Matsumoto et al. | .......... | 353/69 |

FOREIGN PATENT DOCUMENTS

| | | |
|---|---|---|
| EP | 0 349 388 A2 | 10/2003 |
| EP | 1 463 311 A1 | 9/2004 |
| EP | 1 519 576 A1 | 3/2005 |
| JP | A 2000-241874 | 9/2000 |

OTHER PUBLICATIONS

Ramesh Raskar et al., "A Self-Correcting Projector," Proceeding 2001 IEEE Conference on Computer Vision and Pattern Recognition. CVPR 2001. Kauai, Hawaii, Dec. 8-14, 2001, Proceedings of the IEEE Computer Conference on Computer Vision and Pattern Recognition, Los Alamitos, CA IEEE Comp. Soc, US , vol. vol. 1 of 2, Dec. 8, 2001, pp. 504-508, XP010584165 ISBN: 0-7695-1272-0.

* cited by examiner

*Primary Examiner*—W. B. Perkey
*Assistant Examiner*—Rochelle Blackman
(74) *Attorney, Agent, or Firm*—Oliff & Berridge, PLC.

(57) ABSTRACT

The method comprises the steps of: capturing an output image projected on an actual projection surface; outputting imaging information that includes brightness information having a correlation to a brightness; and correcting a distortion of the output image in relation to the input image according to the imaging information. The distortion correcting step comprises the steps of: providing the image projector with a correction image for using in compensation of the distortion of output image; and determining a peak position movement amount, and also distorting in advance the input image so as to compensate for the distortion. The correction image is configured such that an angle change amount of the peak position according to the peak position movement amount, seen from the image projector is closer to the angle of the slope than an all white pattern image.

16 Claims, 9 Drawing Sheets

Projection state

Screen light intensity (screen slope angle $\alpha = 0$)

Imaging unit sensor received light volume (screen slope angle $\alpha = 0$)

Projection state

Screen light intensity (screen slope angle $\alpha = 0.15°$ )

Screen light intensity

Imaging unit sensor received light volume

Screen light intensity (light intensity ratio Lr = 80 %)

Imaging unit sensor received light volume (screen slope angle 0)

Imaging unit sensor received light volume

Compensation process

Curve approximation (curve fitting)

KEYSTONE DISTORTION CORRECTION OF A PROJECTOR

BACKGROUND OF THE INVENTION

1. Field of the Invention

The present invention relates to technology for correcting keystone distortion for a projector.

2. Description of the Related Art

In recent years, projectors for which a video image is projected on a screen have rapidly become popular. Generally, projectors are designed with a prerequisite of being placed directly opposite the screen, so when the projector is not placed directly opposite the screen, the image becomes distorted.

Meanwhile, when the projector is not placed directly opposite the screen, not only the image, but also the brightness distribution fluctuates. Furthermore, when equipping the projector with an image capturing device, the imaging distance differs at the sides of the screen, so even according to the inverse square theorem, at the sides of the screen, there will be fluctuation in the received light amount of the imaging device. This kind of fluctuation in light receiving amount may also be used for estimating the slope of the screen in relation to the light axis of the projector.

However, there is the problem that the fluctuation in the light receiving amount fluctuates not only with the slope of the screen, but also according to the light intensity distribution when the projector is placed directly opposite the screen.

SUMMARY OF THE INVENTION

The present invention was created to solve the problems described above with the prior art, and its purpose is to provide a technology that improves correction accuracy for a projector that performs image distortion correction due to sloping of the screen according to distribution of brightness on the screen.

In order to attain the above and the other objects of the present invention, there is provided a method of projecting an image with an image projector configured to project an image in response to an input image onto a virtual projection surface positioned in a predetermined positional relationship. The method comprising: image capturing step of capturing an output image projected on an actual projection surface; imaging information generating step of outputting imaging information that includes brightness information having a correlation to a brightness, according to the captured image; and distortion correcting step of correcting a distortion of the output image in relation to the input image according to the imaging information, the distortion being caused by a slope between the virtual projection surface and the actual projection surface. The distortion correcting step comprises: correction image providing step of providing the image projector with a correction image for using in compensation of the distortion of output image; and image processing step of determining a peak position movement amount that is a movement amount of a peak position from a peak position of the brightness of the virtual projection surface to a peak position of the brightness for the actual projection surface according to the imaging information, and also distorting in advance the input image so as to compensate for the distortion of the output image according to the determined peak position movement amount. The correction image is configured such that an angle change amount of the peak position according to the peak position movement amount, seen from the image projector is closer to the angle of the slope than an all white pattern image.

With the projector of the present invention, the slope of the projection surface is estimated using a correction image that is formed so that the change amount according to the peak position movement amount of an angle seen from the peak position image projection part is closer to the slope angle than the all white pattern video image, so there is less of a measurement error factor for the concerned slope. As a result, it is possible to realize a high precision compensation for image distortion that is caused by the screen slope.

In the above method, the image processing step may comprise the steps of: determining a peak position angle seen from the image projector according to the imaging information, the peak position angle being a peak position of a brightness for the actual projection surface; estimating the angle of the slope according to a peak position angle movement amount that is a movement amount of the angle to the determined peak position angle from a reference peak position angle, the reference peak position angle being an angle seen from the image projector of a peak position of a brightness for the virtual projection surface; and distorting in advance the input image so as to compensate for the distortion of the output image according to the angle of the determined slope.

In the above methods, the correction image may be configured such that a light intensity distribution for the virtual projection surface is more even than the all white pattern image.

In this way, it is possible to easily form a correction image so that the movement amount of the brightness peak position is close to the skew of the angle between the virtual projection surface and the actual projection surface.

In the above methods, the correction image may be configured such that a light intensity ratio for the virtual projection surface is between 85% and 95%.

In the above methods, the distortion correcting step may have a calibration mode that is an operation mode for reforming the correction image according to the imaging information in a state with which the actual projection surface is placed so as to match the virtual projection surface.

In this way, it is possible to suppress a decrease in measurement precision due to changes over time of optical system parts such as the illumination optical system and the liquid crystal panel.

Note that the present invention may be realized in various formats such as a projector and projector control device, a computer program or firmware for realizing the methods or device functions of these on a computer, a recording medium or product on which that computer program is recorded, data signals for which that computer program is realized within a carrier wave, or a supply container that contains the recording device.

DESCRIPTION OF THE PREFERRED EMBODIMENTS

Figure 1:
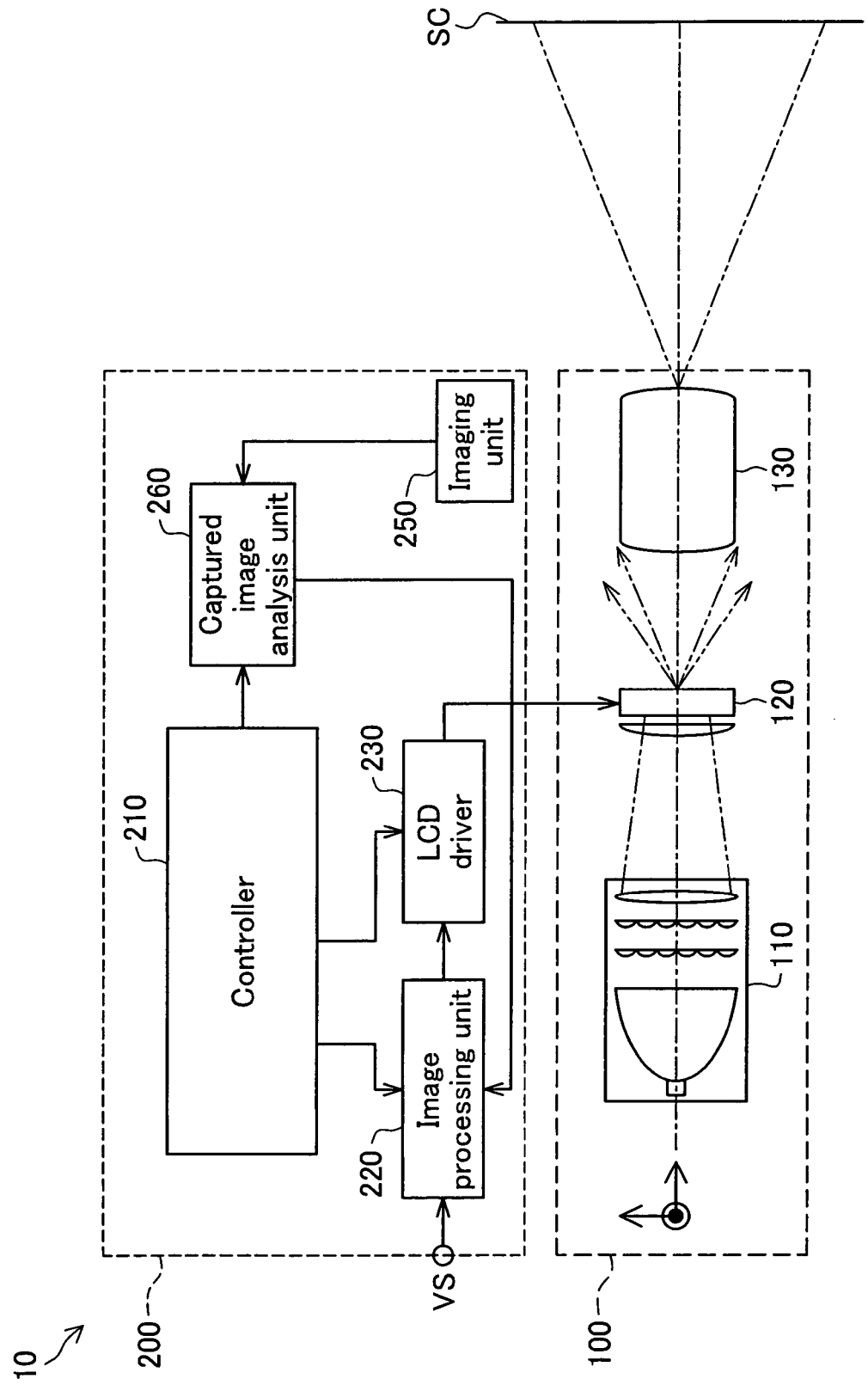
FIG. 1 is a block diagram that shows the structure of a liquid crystal projector 10 as an embodiment of the present invention.

Next, we will explain embodiments of the present invention based on embodiments in the following sequence.
A. Basic Structure of a Liquid Crystal Projector:
B. Estimated Relative Angle When the Optical System Light Intensity Ratio is 100%:
C. Estimated Relative Angle When the Optical System Light Intensity Ratio is 80%:
D. Process of Correcting Keystone Distortion for an embodiment of the Present Invention:
E. Variation Examples:

A. Basic Structure of a Projector:

FIG. 1 is a block diagram that shows the structure of a liquid crystal projector 10 of an embodiment of the present invention. The liquid crystal projector 10 comprises an optical system 100 for projecting an image on the screen SC, an illumination optical system 110, a liquid crystal panel (LCD) 120, and a projection optical system 130. The control system 200 comprises a controller 210, an image processing unit 220, a liquid crystal panel (LCD) driver 230, a captured image analysis unit 260, and an imaging unit 250.

The controller 210 has a CPU and memory that are not illustrated. The controller 210 controls the image processing unit 220, the LCD driver 230, and the captured image analysis unit 260.

The image processing unit 220 processes input image signals given from the outside and generates input signals to the LCD driver 230. For processing input image signals, various image processes are included such as image quality adjustment processing and keystone distortion correction processing. Included in the image quality adjustment processing, for example, are brightness adjustment and color temperature adjustment. Keystone distortion correction processing is a process for correcting image distortion (keystone distortion) that occurs when the screen SC is directly opposite the light axis of the optical system 100 of the liquid crystal projector 10.

The LCD driver 230 generates a drive signal for driving the liquid crystal panel 120 based on the image data input from the image processing unit 220. This drive signal is supplied to the liquid crystal panel 120 and is used to control the transmitted light amount of each pixel that the liquid crystal panel 120 has. The light that is transmitted through the liquid crystal panel 120 is illuminated on the projection optical system 130.

The projection optical system 130 projects light illuminated from the liquid crystal panel 120 onto the screen SC. The screen SC is illuminated so as to have a specified light intensity ratio by the projection light. Here, the illumination status on the screen SC is imaged by the imaging unit 250.

Figure 2:
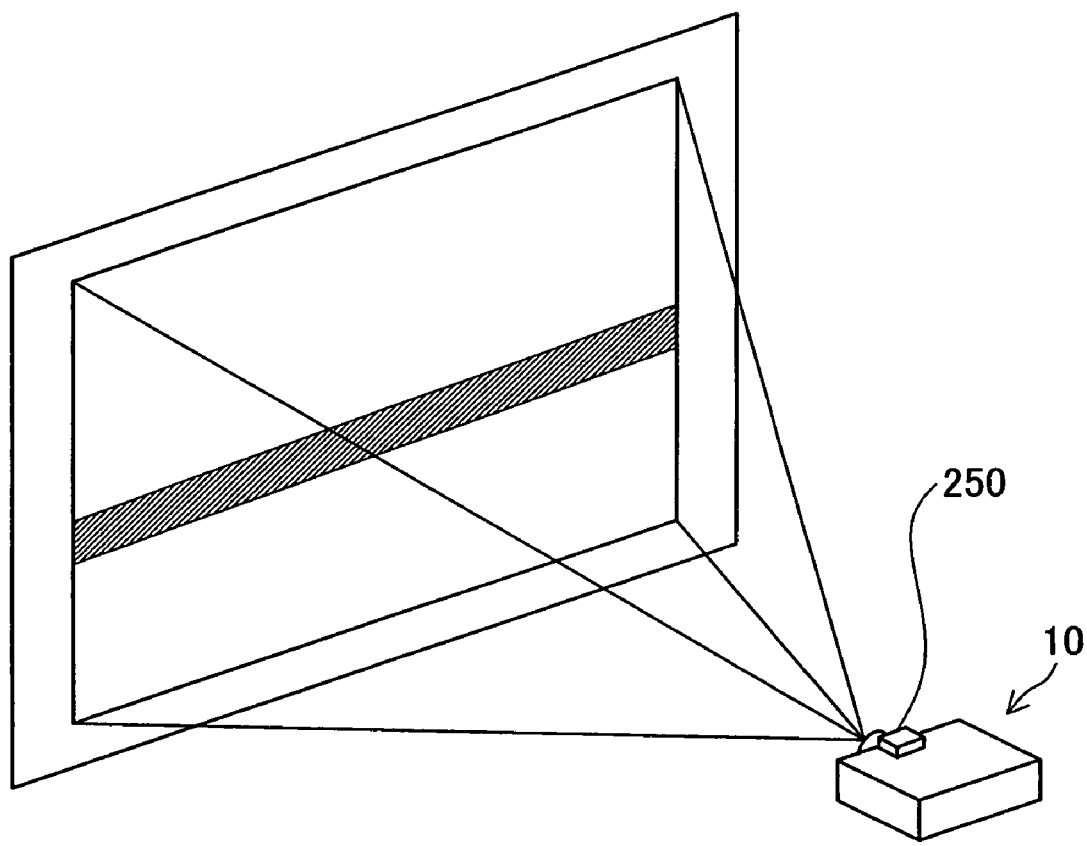
FIG. 2 is an explanatory diagram that shows the equipped state of an imaging unit 250 for an embodiment of the present invention.

FIG. 2 is an explanatory diagram that shows the equipped state of the imaging unit 250 for an embodiment of the present invention. The imaging unit 250 is equipped so as to have a light axis parallel to the projection optical system 130 near the projection optical system 130 of the liquid crystal projector 10. The imaging unit 250 has an angle of field that encompasses the illumination range of the projection optical system 130.

Note that with this embodiment, to make the explanation easier to understand, the imaging unit 250 has the cross hatched area as its observation area. This observation area is an area set at approximately the same height as the projection optical system 130. With this embodiment, observation of the brightness is done discretely within this area.

Figure 3A:
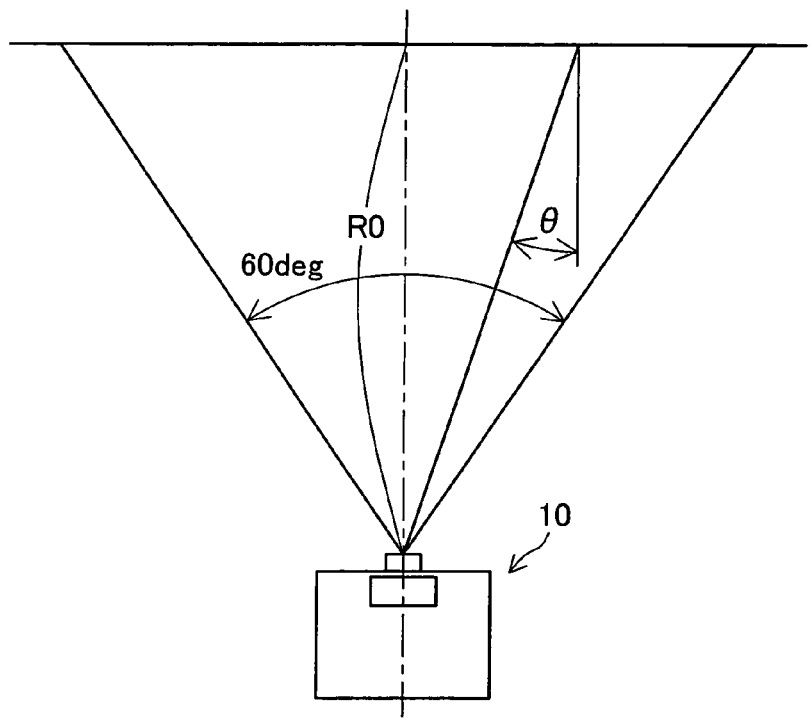
FIGS. 3(a), 3(b), and 3(c) are explanatory diagrams that show the projection state for an embodiment of the present invention.
Figure 3B:
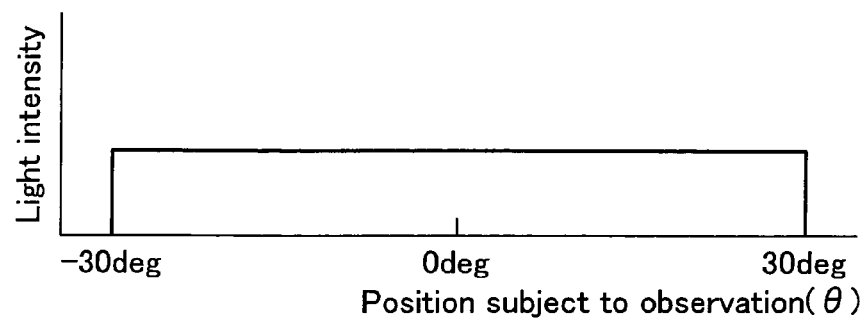
Figure 3C:
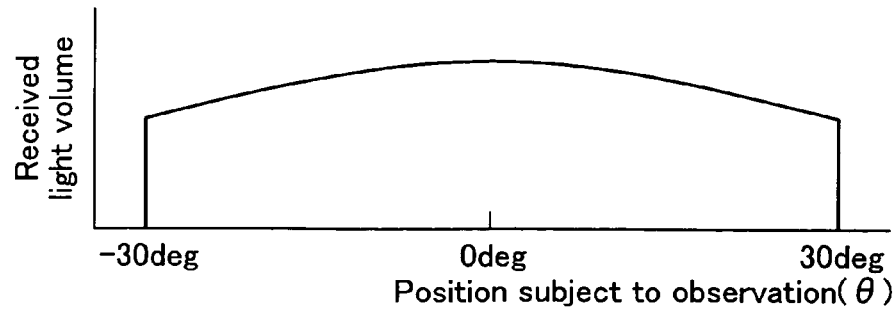

B. Estimated Relative Angel when the Optical System Light Intensity Ratio is 100%:

FIGS. 3(a), 3(b), and 3(c) are explanatory diagrams that show the projection state for an embodiment of the present invention. FIG. 3(a) is a figure showing the relative position of the liquid crystal projector 10 and the screen SC seen from above. The liquid crystal projector 10 has an illumination area of 60 degrees from side to side. With this embodiment, each position of the projection surface of the screen SC is stipulated by coordinates which have an optical principal point of the projection optical system 130 as the center. Note that with FIG. 3, the projection surface of the screen SC is placed in the "virtual projection surface" in the claims.

FIG. 3(b) shows the light intensity of each position of the projection surface of the screen SC. With this example, the projection optical system 130 is structured to have a light intensity ratio of 100% when a 100% all white pattern video image is projected, and the projection surface of the screen SC has an even light intensity on the illumination area of the projection optical system 130. Here, the "light intensity ratio" means the light intensity rate between the center point of the projected image and the peripheral part, and a light intensity ratio of 100% means that the light intensity of the center point and the peripheral part match.

FIG. 3(c) shows the received light amount of the sensor surface that is not illustrated by light received from the projection surface of the screen SC. The surface of the screen SC is projected onto the sensor surface by the optical system, which is not illustrated, of the imaging unit 250. As can be seen from FIG. 3(c), the received light amount of the sensor surface is not even regardless of whether the light intensity of the projection surface of the screen SC is even. This is because since the projection surface of the screen SC can capture each part as a point light source, that illumination light reaches the sensor surface according to Lambert's cosine law and the inverse square law. Here, the projection surface of the screen SC is a perfectly diffusing surface to make the explanation easier to understand.

Lambert's cosine law is a law whereby the light velocity of light received from the light emitting surface by the observation point is proportional to the cosine of angle θ between the light emitting surface normal line and the line that connects the observation point and the light emitting surface. Meanwhile, the inverse square law is a law whereby the light velocity of light received from the light emitting surface by the observation point is inversely proportional to the distance between the observation point and the light emitting surface.

As a result, the received light amount (FIG. 3(c)) of the sensor surface from each part of the projection surface of the screen SC is a value of $COS^3 \theta \div R0^2 (= COS \theta \div (R0 \div COS \theta)^2)$ multiplied by the light intensity of each part of the projection surface of the screen SC.

Figure 4A:
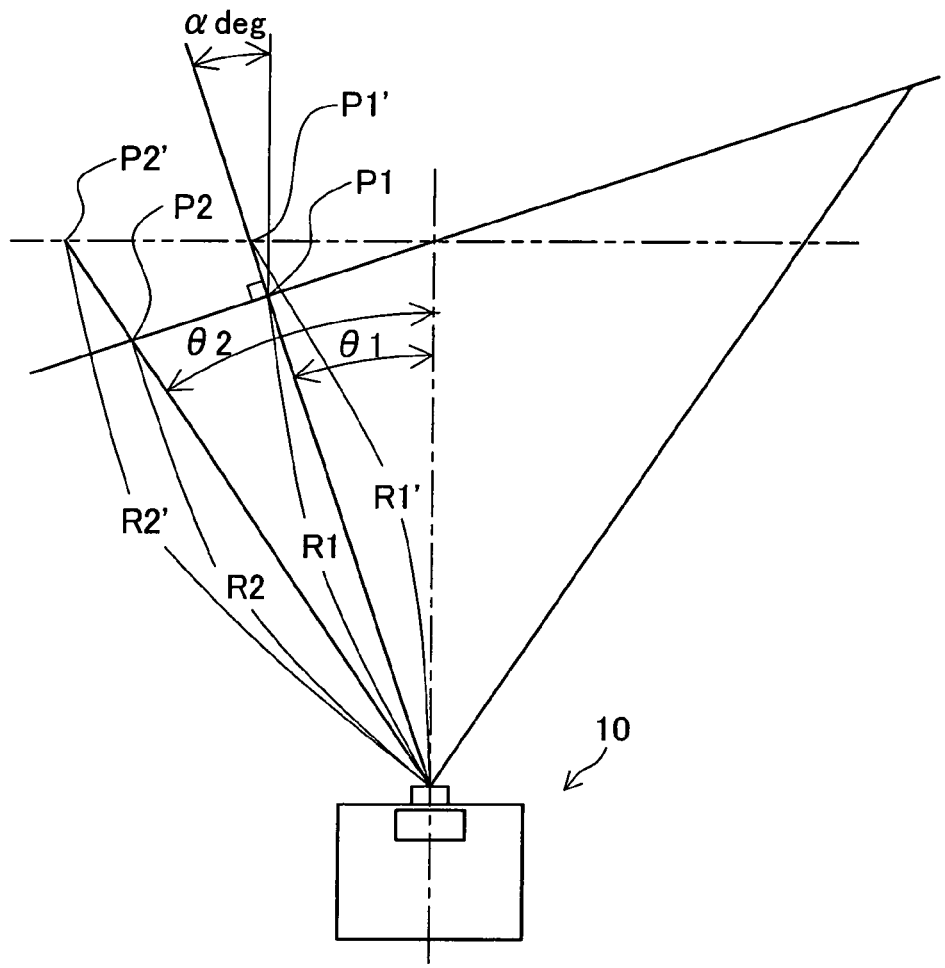
FIGS. 4(a) and 4(b) are explanatory diagrams that show the projection state in a case when screen SC slopes at an angle a in relation to the light axis of the projection optical system 130.
Figure 4B:
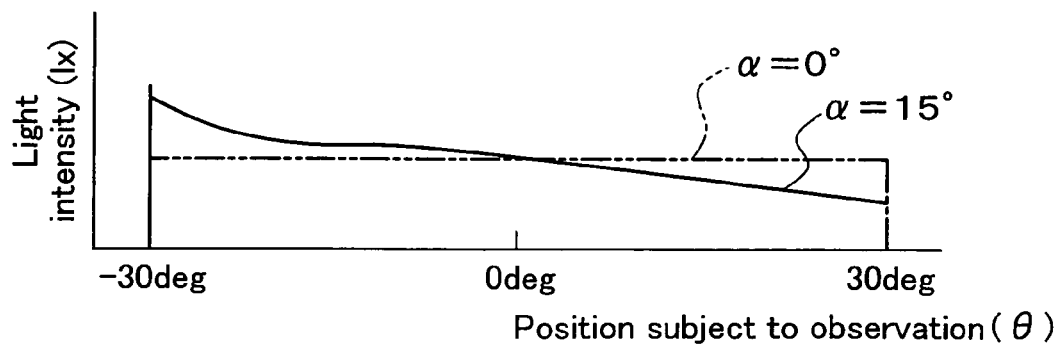

FIGS. 4(a) and 4(b) are explanatory diagrams that show the projection state when the screen SC is sloping by angle a in relation to the light axis of the projection optical system 130. FIG. 4(a) is a diagram that shows the relative position of the liquid crystal projector 10 and a screen SC that has a slope of a degrees seen from above. FIG. 4(b) shows the light intensity of each position of the projection surface of a screen SC that has a slope of a degrees.

As can be seen from FIG. 4(b), the light intensity of each position of the projection surface of the screen SC becomes higher as we go toward the left side. For example, the light intensity of point P1 on the screen SC has a light intensity of the size of the light intensity of point P1' multiplied by the square of the projection distance ratio (R1'/R1), and the light intensity of point P2 on the screen SC has a light intensity of the size of the light intensity of the point P2' multiplied by the square of the projection distance ratio (R2'/R2). This is because meanwhile, the projection distance ratio becomes higher as we go toward the left.

Figure 5A:
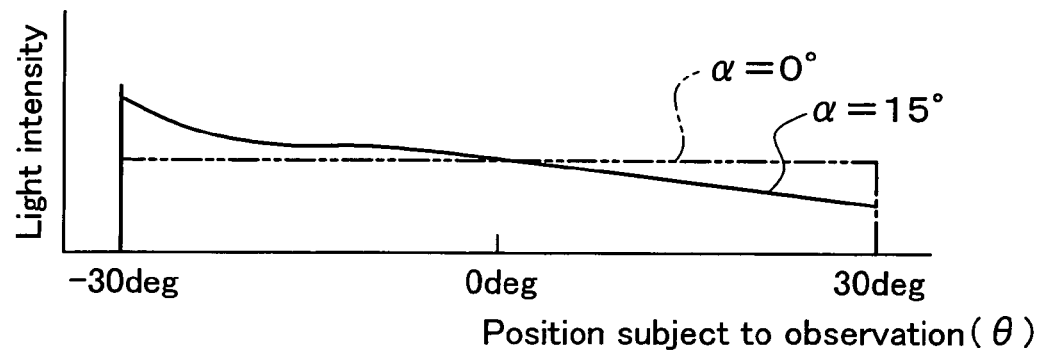
FIGS. 5(a) and 5(b) show the light receiving amount of a sensor surface in a case when screen SC does slope at an angle α and in a case when it does not slope in relation to the light axis of the projection optical system 130.
Figure 5B:
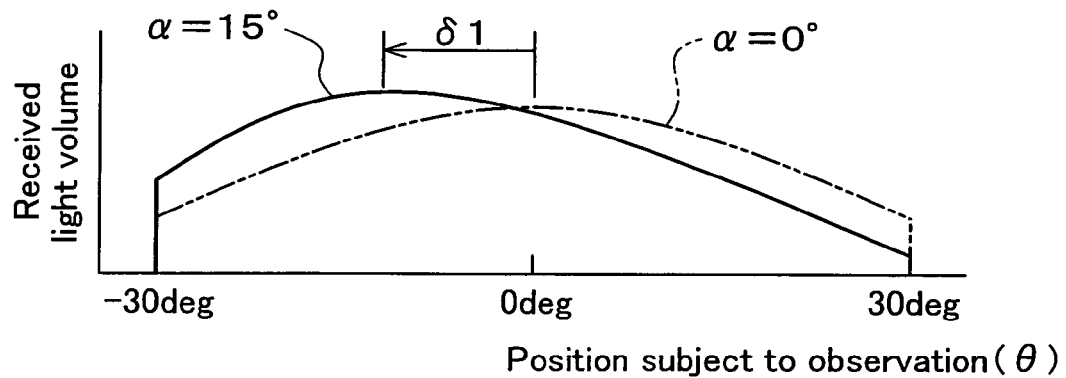

FIGS. 5(a) and 5(b) show the received light amount of the sensor surface when the screen SC is sloped at an angle a in relation to the light axis of the projection optical system 130 and when it is not sloped. FIG. 5(a) is the same figure as FIG. 4(b). FIG. 5(b) shows a value derived from the value of FIG. 5(a) according to Lambert's cosine law and the inverse square law.

As can be seen from FIG. 5(b), the sensor surface received light amount distribution has its peak shift to the left side according to the slope of the screen SC. With the example in this figure, the shift amount is δ 1 degree. The shift amount fluctuates according to the slope of the screen SC, so we can see that it is possible estimate the slope of the screen SC based on the shift amount.

In this way, theoretically, we can see that it is possible to estimate the relative positional relationship (angle) of the projector and the screen according to the light intensity peak shift amount on the screen SC. However, it is necessary to consider the point that the shift amount and the screen SC slope do not necessarily match.

Figure 6A:
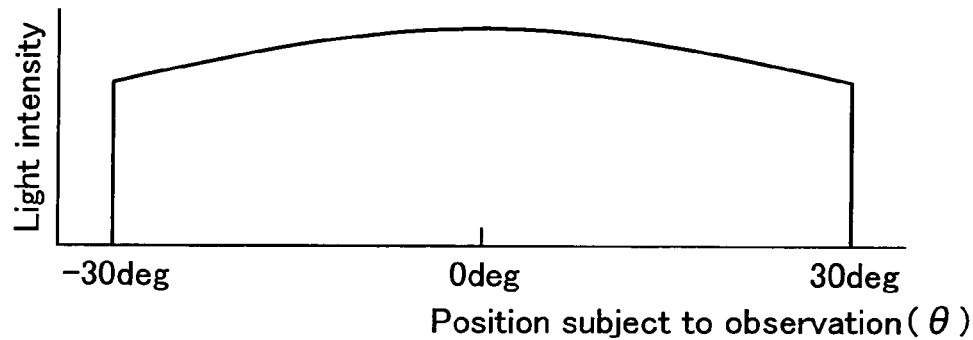
FIGS. 6(a), 6(b), and 6(c) are explanatory diagrams that show the light intensity distribution of the screen SC and the received light amount distribution on the sensor surface when the light intensity ratio of the optical system is 80%.
Figure 6B:
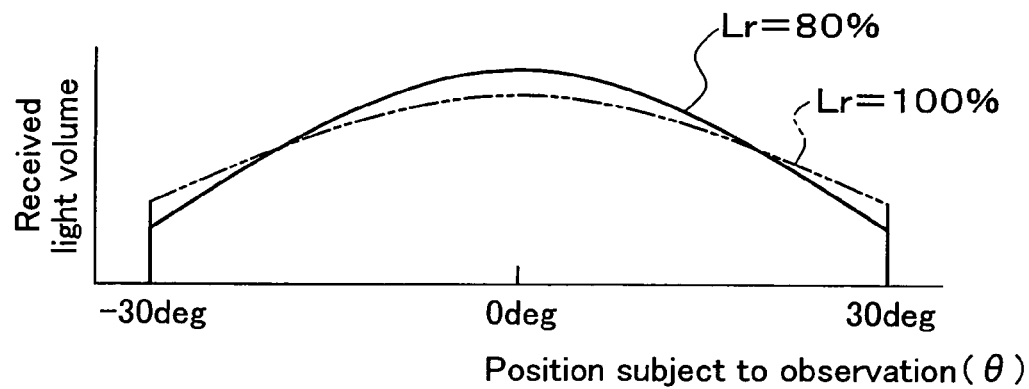
Figure 6C:
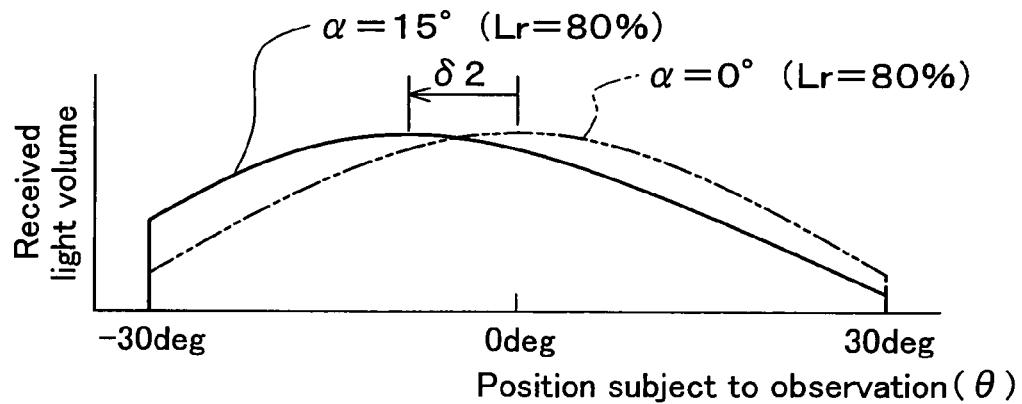

C. Estimated Relative Angel when the Optical System Light Intesity Ratio is 80%:

FIGS. 6(a), 6(b), and 6(c) are explanatory diagrams that show the light intensity distribution of the screen SC and the sensor surface received light amount distribution when the optical system light intensity ratio is 80%. FIG. 6(a) shows the light intensity distribution of the screen SC. With this example, the light intensity of both edges at left and right is 80% of the light intensity of the center part.

FIG. 6(b) shows the sensor surface received light amount distribution when there is no slope for the screen SC. The dot-dash line shows the received light amount distribution when the light intensity ratio Lr is 100%, and this is equivalent to the received light amount distribution of FIG. 3(c). The solid line shows the received light amount distribution when the light intensity ratio Lr is 80%. As can be seen from FIG. 6(b), when the light intensity ratio Lr is 80%, even more than when the light intensity ratio Lr is 100%, there is a tendency for the received light amount of the center part to become higher, and for the received light amount of the peripheral part to become lower.

FIG. 6(c) shows the sensor surface received light amount distribution when there is a slope for the screen SC and when there isn't a slope. The same as the figure of FIG. 5(b), the sensor surface received light amount distribution has the peak shift to the left side according to the slope of the screen SC. However, the shift amount decrease from δ 1 degree to δ 2 degrees. This fact means that the shift amount changes not just by the slope of the screen SC but also according to the light intensity ratio of the projection optical system 130.

Here, as a general trend for projector optical systems, there is a trade off relationship between light intensity and the light intensity ratio. Specifically, when an attempt is made to make the light intensity ratio higher, there is a tendency for the light intensity to decrease because of this, with a typical projector, the design is done such that the light intensity ratio is suppressed and the light intensity increases, so the light intensity ratio is approximately 80%.

With this embodiment, when the light intensity ratio Lr is 100%, while the shift amount (angle) becomes larger than the angle of the slope of the screen SC, when the light intensity ratio Lr is 80%, the shift amount (angle) is smaller than the angle of the slope of the screen SC. This fact means that if the light intensity ratio Lr is set appropriately, it is possible to configure such that the shift amount and the slope of the screen SC match.

Furthermore, with a typical projector optical system, if the light intensity ratio is in a range of 85% to 95%, we found through experimentation that it is possible to configure such that the shift amount approximately matches the angle of the slope of the screen SC.

Figure 7:
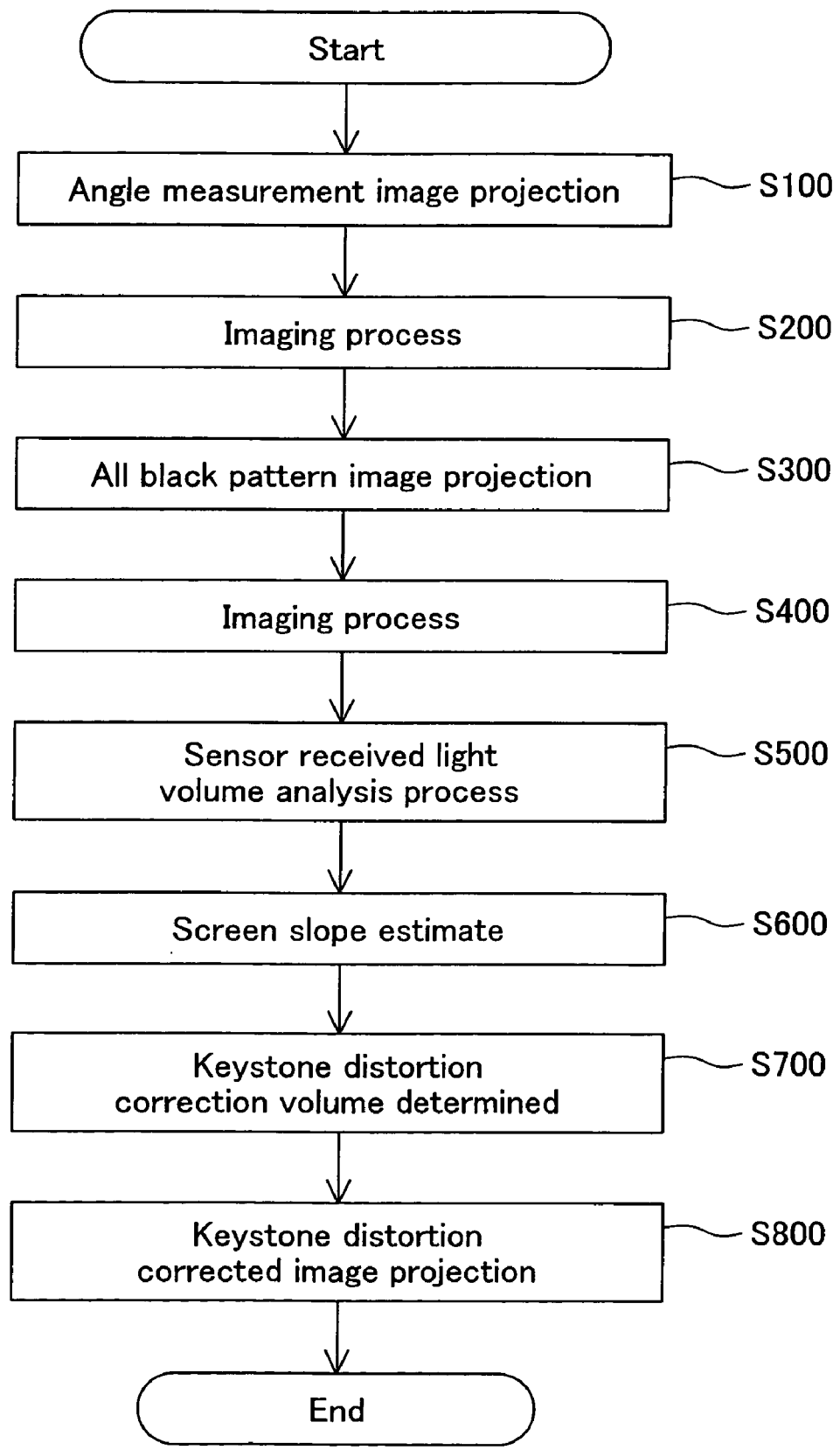
FIG. 7 is a flow chart that shows a keystone distortion correction processing routine for an embodiment of the present invention.

D. Process of Correcting Keystone Distortion for an Embodiment of the Present Invention:

FIG. 7 is a flow chart that shows the keystone distortion correction processing routine for an embodiment of the present invention. With this embodiment, we are assuming no slope in the vertical direction to make the explanation easy to understand. Because of this, with the keystone distortion correction processing of the embodiment of the present invention, only the slope of the screen in the horizontal direction will be measured.

At step S100, the liquid crystal projector 10 projects the correction image onto the screen SC. The correction image is an image formed so that the light intensity ratio of the projection surface of the screen SC is 90%. The correction image is formed such that the transmitted light amount of the liquid crystal panel 120 is adjusted in relation to the all white pattern image, the projected light amount to the center part of the screen SC is reduced, and by doing this, a light intensity ratio of 90% is realized.

At step S200, the imaging unit 250 (FIG. 1, FIG. 2) performs the imaging process. The imaging process is a process with which the light amount from a specified imaging area among the areas for which the correction image was captured is measured. With this embodiment, the specified imaging area correlates to the "brightness information" in the claims.

At step S300, the liquid crystal projector 10 captures the all black pattern image on the screen SC. The all black pattern image is an image formed such that the transmitted light amount of the liquid crystal panel 120 is a minimum value.

At step S400, the imaging unit 250 performs the imaging process. The imaging of the all black pattern image is to find the difference with the correction image and to inhibit the effect due to the ambient light.

At step S500, the captured image analysis unit 260 performs sensor received light amount analysis processing. The senor received light amount analysis process is a process with which the correction image and the all black pattern image are projected and the acquired received light amount difference is acquired at each moment for the sensor field of view, and mapping is performed on the angle coordinate system using the principal point which is the optical center of the projection optical system 130 as the reference.

At step S600, the captured image analysis unit 260 estimates the slope of the screen SC. The slope of the screen SC is determined according to the angle of the peak position of the received light amount in relation to the light axis of the projection optical system 130.

Figure 8A:
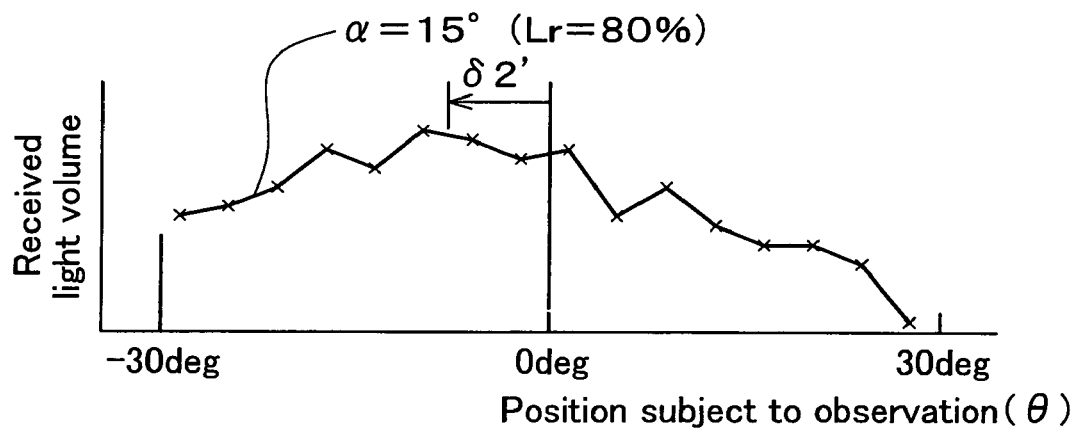
FIGS. 8(a) and 8(b) are explanatory diagrams that show the state of determining a peak position for an embodiment of the present invention.
Figure 8B:
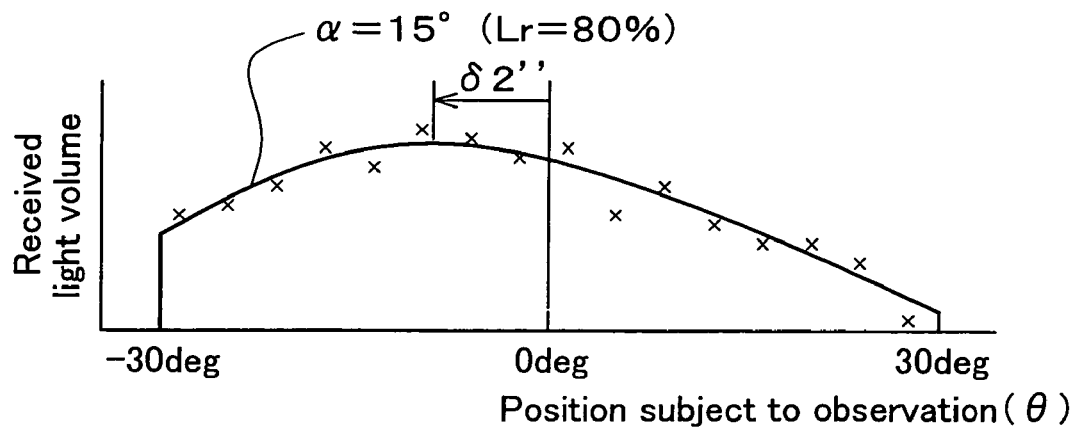

Determination of the peak position may also be determined by a simple comparison and compensation process of the received light amount mapped in the angle coordinate system as shown in FIG. 8(a), for example (δ2'), or may be determined by a curve approximation method (curve fitting) using the least squares method as shown in FIG. 8(b) (δ2"), for example. The former has the advantage of the algorithm being simple, so the calculation process is also simple. The latter has the advantage of having a small estimate error for the angle of the screen SC due to received light amount measurement noise. Furthermore, the curve approximation method has the effect of being able to make the noise effect smaller even when there is a great deal of noise near the peak position.

In this way, the estimated slope of the screen SC is sent from the captured image analysis unit 260 (FIG. 1) to the image processing unit 220.

At step S700, the image processing unit 220 determines the keystone distortion correction amount. Keystone distortion correction is a process of distorting an image in the reverse direction for an image that is projected in advance so that the image distortion that occurs due to the slope of the screen SC decreases (in other words, so that it is compensated for). The keystone distortion correction amount means the amount of this reverse direction distortion.

Figure 9:
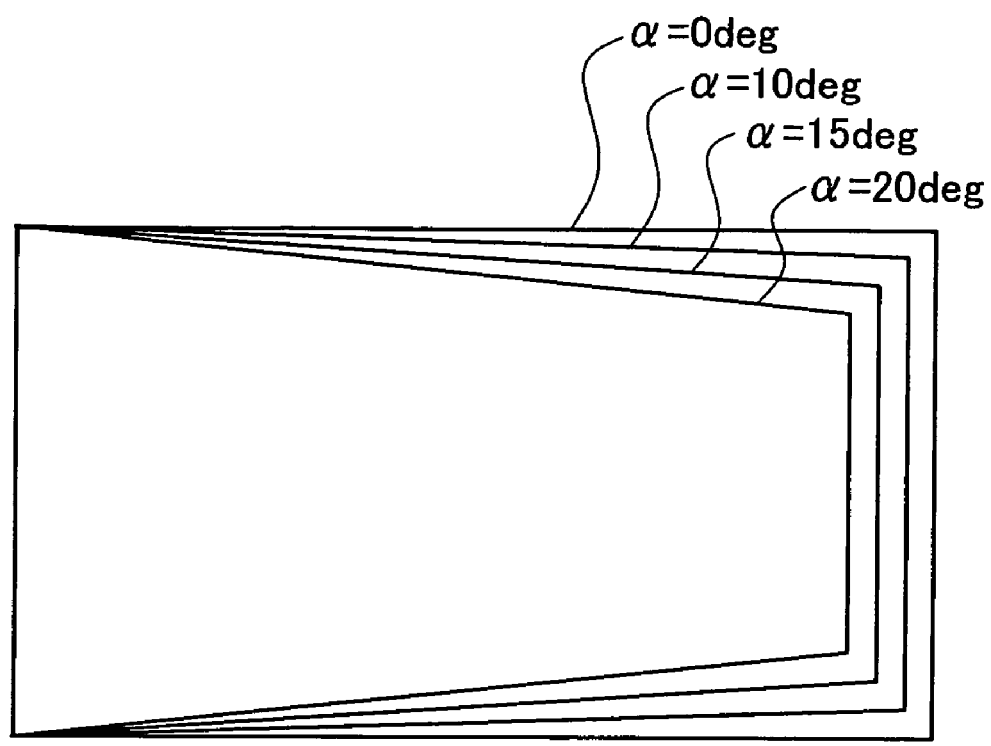
FIG. 9 is an explanatory diagram that shows the relationship between the slope of the screen SC and the keystone distortion correction amount for an embodiment of the present invention.

FIG. 9 is an explanatory diagram that shows the relationship between the slope of the screen SC and the keystone distortion correction amount for an embodiment of the present invention. As can be seen from FIG. 9, as the slope of the screen SC becomes larger, the correction amount also becomes larger. The reason that the correction amount becomes larger as the slope of the screen SC becomes larger is that when the slope of the screen SC becomes larger, the distance from the principal point of the projection optical system 130 to the projection surface of the screen SC greatly differs from side to side.

At step S800, the liquid crystal projector 10 projects an image with keystone distortion already corrected. Projection of an image for which keystone distortion is already corrected is performed by the image processing unit 220 using a determined keystone distortion correction amount and projecting after the projection image is distorted in advance.

In this way, with this embodiment, it is possible to measure the angle skew using a correction image formed so that the movement amount of the brightness peak position matches the angle skew between the virtual projection surface and the actual projection surface, so it is possible to measure angle skew directly based on the peak position movement amount.

E. Variation Examples

Note that the present invention is not limited to the embodiments and embodiments noted above, and it is possible to implement this in various forms without straying from the scope of the key points, with the following variations possible, for example.

E-1. With the embodiments described above, only the horizontal direction screen SC slope was estimated and keystone distortion correction was executed only in the horizontal direction, but it is also possible to combine the vertical direction keystone distortion correction. For estimating the vertical direction angle, it is possible to have the liquid crystal projector 10 measure using a sensor for which a tilt mechanism that adjusts the light axis in the gravity direction or the vertical direction is built in, for example, or measure according to the movement amount of the brightness peak position in the up and down direction. It is also possible to independently perform vertical direction keystone distortion correction according to the embodiment described above.

Note that the "a slope between the virtual projection surface and the actual projection surface" in the claims means the angle skew that occurs in at least one direction of the horizontal direction or the vertical direction.

E-2. With the embodiments described above, the correction image was formed so that the peak position movement amount would match the angle skew, but this does not absolutely have to match perfectly. For example, it is also possible to store the angle difference between the peak position movement amount and the angle skew in memory, which is not illustrated, of liquid crystal projector 10 at the time of manufacturing, and to use this angle difference and peak position movement amount to determine the angle skew. The present invention is acceptable as long as the correction image is generally formed so that the peak position movement amount is closer to the angle skew than the all white pattern video image. However, with the embodiments described above, there is the advantage of being able to decrease the measurement error due to the angle difference described above.

E-3. With the embodiments described above, attention was focused on the light intensity ratio and the light intensity distribution uniformity, and by adjusting this, the correction image was formed so that the peak position movement amount would approach the angle skew, but it is also possible to form this so that the peak position movement amount will approach the angle skew, or also to form a correction image pattern regardless of the light intensity ratio and light intensity distribution uniformity.

E-4. With the embodiments described above, the image projector was formed so that the light axis is placed perpendicular to and directly opposite the horizontal direction in relation to the screen SC, but, for example, it is also possible to form this so that being placed at a diagonal to the horizontal direction is a prerequisite. The image projector used with the present invention may be formed so that an image is projected on a virtual projection surface placed in a specified positional relationship that is set in advance, and it is not necessary to have the virtual projection surface be perpendicular to and directly opposite the light axis of the image projector.

E-5. With the embodiments described above, the effect of ambient light was inhibited by imaging by projecting an all black pattern, but projection of the all black pattern is not essential and may be omitted. Projection of the all black pattern has the advantage of making it possible to increase the measurement precision by inhibiting the effect of ambient light.

E-6. For liquid crystal projectors and other projectors, it is further desirable to have a calibration mode that is an operating mode that reforms a correction image according to the imaging information in a state with the actual projection surface placed to match the virtual projection surface.

This calibration mode may be realized by adding a means (such as a switch or interface screen) of performing input to give notice to the projector that the actual projection surface is in a state placed to match the virtual projection surface. This is because by doing this, it is possible to inhibit the decrease in measurement precision due to changes over time in optical system parts such as the illumination optical system or liquid crystal panel (or DMD (registered trademark) panel).

E-7. With the embodiments described above, the present invention is formed as a liquid crystal projector 10, but it can also be formed as a projector of another method such as the DLP (registered trademark) method or three tube method. Furthermore, with the embodiments described above, the present invention was formed as a front format projector, but it is also possible to apply this to a rear format projector.

E-8. With the embodiments described above, an angle is used as the variable that shows the peak position shift amount, but it is also possible to form this so that the keystone distortion correction amount is determined using the image position of a sensor, which is not illustrated, that the imaging device has, for example. Generally, the image processing unit of the present invention is acceptable if it is formed so as to distort the input image in advance so as to compensate for the distortion of the output image according to the peak position movement amount.

E-9. With the embodiments described above, the correction image is formed so as to realize a reduction in the transmitted light amount to the center part of the screen SC by adjusting the transmitted light amount of the liquid crystal panel 120 in relation to an all white pattern image, but it is also possible to form the correction image with other than the all white pattern image as a reference. Specifically, it is not absolutely necessary to have the correction image have the highest brightness pixels with the maximum transmitted light amount, and only the light intensity ratio on the screen would be a problem.

When part or all of the functions of the invention are attained by the software configuration, the software (computer programs) may be stored in computer-readable recording media. The 'computer-readable recording media' of the invention include portable recording media like flexible disks and CD-ROMs, as well as internal storage devices of the computer, such as various RAMs and ROMs, and external storage devices fixed to the computer, such as hard disks.

The Patent applications given below as the bases of the priority claim of the present application are included in the disclosure hereof by reference:

(1) patent application Ser. No. 2004-99438 (filed on Mar. 30, 2004)

(2) patent application Ser. No. 2005-7161 (filed on Jan. 14, 2005)

What is claimed is:

1. A method of projecting an image with an image projector configured to project an image in response to an input image onto a virtual projection surface positioned in a predetermined positional relationship, the method comprising:

an image capturing step of capturing an output image projected on an actual projection surface;

an imaging information generating step of outputting imaging information that includes brightness information having a correlation to a brightness, according to the captured image; and a distortion correcting step of correcting a distortion of the output image in relation to the input image according to the imaging information, the distortion being caused by a slope between the virtual projection surface and the actual projection surface, wherein the distortion correcting step comprises:

a correction image providing step of providing the image projector with a correction image for using in compensation of the distortion of output image; and an image processing step of determining a peak position movement amount that is a movement amount of a peak position from a peak position of the brightness of the virtual projection surface to a peak position of the brightness for the actual projection surface according to the imaging information, and also distorting in advance the input image so as to compensate for the distortion of the output image according to the determined peak position movement amount, wherein the correction image is configured such that an angle change amount of the peak position according to the peak position movement amount, seen from the image projector is closer to the angle of the slope than an all white pattern image.

2. The method according to claim 1, wherein the image processing step comprises the steps of:

determining a peak position angle seen from the image projector according to the imaging information, the peak position angle being a peak position of a brightness for the actual projection surface;

estimating the angle of the slope according to a peak position angle movement amount that is a movement amount of the angle to the determined peak position angle from a reference peak position angle, the reference peak position angle being an angle seen from the image projector of a peak position of a brightness for the virtual projection surface; and distorting in advance the input image so as to compensate for the distortion of the output image according to the angle of the determined slope.

3. The method according to claim 1, wherein the correction image is configured such that a light intensity distribution for the virtual projection surface is more even than the all white pattern image.

4. The method according to claim 1, wherein the correction image is configured such that a light intensity ratio for the virtual projection surface is between 85% and 95%.

5. The method according to claim 1, wherein the distortion correcting step has a calibration mode that is an operation mode for reforming the correction image according to the imaging information in a state with which the actual projection surface is placed so as to match the virtual projection surface.

6. The method according to claim 2, wherein the correction image is configured such that a light intensity distribution for the virtual projection surface is more even than the all white pattern image.

7. The method according to claim 2, wherein
the correction image is configured such that a light intensity ratio for the virtual projection surface is between 85% and 95%.

8. The method according to claim 2, wherein
the distortion correcting step has a calibration mode that is an operation mode for reforming the correction image according to the imaging information in a state with which the actual projection surface is placed so as to match the virtual projection surface.

9. A projector, comprising:

an image projector configured to project an image in response to an input image onto a virtual projection surface positioned in a predetermined positional relationship;

an output image capturing unit configured to image an output image projected on an actual projection surface;

an imaging information generator configured to output imaging information that includes brightness information having a correlation to a brightness, according to the captured image; and a distortion corrector configured to correct a distortion of the output image in relation to the input image according to the imaging information, the distortion being caused by a slope between the virtual projection surface and the actual projection surface, wherein the distortion corrector comprises:

a correction image provider configured to provide the image projector with a correction image for using in compensation of the distortion of output image; and an image processor configured to determine a peak position movement amount that is a movement amount of a peak position from a peak position of the brightness of the virtual projection surface to a peak position of the brightness for the actual projection surface according to the imaging information, and also distort in advance the input image so as to compensate for the distortion of the output image according to the determined peak position movement amount, wherein the correction image is configured such that an angle change amount of the peak position according to the peak position movement amount, seen from the image projector is closer to the angle of the slope than an all white pattern image.

10. The projector according to claim 9, wherein
the image projector comprises:

a peak position determiner configured to determine a peak position angle seen from the image projector according to the imaging information, the peak position angle being a peak position of a brightness for the actual projection surface;

a slope angle estimator configured to estimate the angle of the slope according to a peak position angle movement amount that is a movement amount of the angle to the determined peak position angle from a reference peak position angle, the reference peak position angle being an angle seen from the image projector of a peak position of a brightness for the virtual projection surface; and an image deformation unit configured to distort in advance the input image so as to compensate for the distortion of the output image according to the angle of the determined slope.

11. The projector according to claim 9, wherein
the correction image is configured such that a light intensity distribution for the virtual projection surface is more even than the all white pattern image.

12. The projector according to claim 9, wherein
the correction image is configured such that a light intensity ratio for the virtual projection surface is between 85% and 95%.

13. The projector according to claim 9, wherein
the distortion corrector has a calibration mode that is an operation mode for reforming the correction image according to the imaging information in a state with which the actual projection surface is placed so as to match the virtual projection surface.

14. The projector according to claim 10, wherein
the correction image is configured such that a light intensity distribution for the virtual projection surface is more even than the all white pattern image.

15. The projector according to claim 10, wherein
the correction image is configured such that a light intensity ratio for the virtual projection surface is between 85% and 95%.

16. The projector according to claim 10, wherein
the distortion corrector has a calibration mode that is an operation mode for reforming the correction image according to the imaging information in a state with which the actual projection surface is placed so as to match the virtual projection surface.

* * * * *